United States Patent [19]
Herron et al.

[11] Patent Number: 5,010,779
[45] Date of Patent: Apr. 30, 1991

[54] AUTOMATIC STEERING WHEEL PIVOTING MECHANISM

[75] Inventors: Ross W. Herron, Lathrup Village; Garry E. Beard, Livonia, both of Mich.

[73] Assignee: Ultra Precision Manufacturing, Ltd., Birmingham, Mich.

[21] Appl. No.: 402,782

[22] Filed: Sep. 5, 1989

[51] Int. Cl.[5] .................................................. B62D 1/18
[52] U.S. Cl. ....................................... 74/493; 280/775
[58] Field of Search ........................... 74/493; 280/775

[56] References Cited

U.S. PATENT DOCUMENTS

| | | | |
|---|---|---|---|
| 3,216,521 | 11/1965 | Ulrich | 74/493 |
| 4,503,504 | 3/1985 | Suzumura et al. | 280/775 |
| 4,691,587 | 9/1987 | Farrand et al. | 280/775 |
| 4,900,059 | 2/1990 | Kinoshita et al. | 280/775 |
| 4,934,737 | 6/1990 | Nakatsuka | 74/493 |

FOREIGN PATENT DOCUMENTS

| | | | |
|---|---|---|---|
| 3618266 | 10/1987 | Fed. Rep. of Germany | 74/493 |
| 60-12375 | 1/1985 | Japan | 74/493 |
| 60-157963 | 8/1985 | Japan | 74/493 |
| 62-39365 | 2/1987 | Japan | 74/493 |

Primary Examiner—Leslie A. Braun
Assistant Examiner—Scott Anchell
Attorney, Agent, or Firm—Dykema Gossett

[57] ABSTRACT

A vehicle steering system is disclosed that includes an automatic drive for pivoting a steering wheel and wheel column with respect to a fixed steering column. In one embodiment, a rack and worm gear connection is driven by an automatic controller to position the steering wheel at any of an infinite number of pivoted positions. An operator may preselect and store a desired position in a memory and controls are disclosed for setting the preselected position in the memory.

19 Claims, 2 Drawing Sheets

AUTOMATIC STEERING WHEEL PIVOTING MECHANISM

This application relates to a apparatus for automatically positioning a vehicle steering wheel in one of a infinite number of pivoted positions with respect to the operator.

Pivotable steering wheels, or tilt steering wheels as they are commonly known, are employed in many modern vehicles and allow an operator to manually select any one of a plurality of pivoted positions for the steering wheel with respect to the vehicle seat and fixed instrument panel. Many of the prior art tilt steering wheels utilize a steering column fixed to the vehicle and a wheel column pivoted to the fixed steering column. A latch member is fixed to the wheel column and has a plurality of notches. A pawl bar fixed to the steering column is selectively, and manually, moved into and away from any one of the notches in the latch member to secure the wheel at a desired pivoted position with respect to the steering column.

These manually pivoted mechanisms required repeated adjustments to conform to the characteristics of an individual driver. If a single vehicle is utilized by a plurality of drivers, the wheel must be repositioned for each new driver since the previous driver would have pivoted the wheel to an individually desired position. In addition, these prior art mechanisms may not always adequately secure the steering wheel since the connection between the pawl bar and the latch member was at a single notch, that is, a one point connection. Also, the use of a pawl connection provide a limited number of possible pivoted positions.

It is therefore an object of the present invention to disclose a secure vehicle steering wheel pivoting mechanism that will automatically position a steering wheel to a desired position from an infinite number of positions.

SUMMARY OF THE INVENTION

The present invention discloses a steering wheel pivoting mechanism that utilizes a mechanical drive to move the steering wheel to any one of a infinite number of pivoted positions with respect to a vehicle seat and steering column. The drive preferably includes a rotary motor powered by a controller receiving feedback signals indicating the actual relative position of the steering wheel.

One embodiment of this invention discloses a vehicle steering wheel pivoting mechanism that reads a signal off an ignition key to identify the particular driver utilizing the vehicle. The controller has a memory that stores a preselected pivoted position for the particular driver and drives the rotary motor to position the steering wheel at the particular driver's preselected position. When the vehicle is turned off, the steering wheel is automatically pivoted to a vertically uppermost position allowing easy exiting and access back into the vehicle.

The ability of the vehicle steering wheel pivoting mechanism to read a signal from the ignition key allows the mechanism to position the steering wheel to a desired position for any of several drivers. This is important, for instance, if a husband and wife alternately drive a single automobile.

Override switch means are disclosed that allow an operator to pivot the steering wheel to a position other than the desired position associated with the individual ignition key. This may be important if, for instance, a third party other than the normal key owner utilizes the vehicle or if a copy of the key is made which would not send a signal to the controller. The override switch also allows an operator to preselect a desired position in combination with a set switch. The operator moves the override switch to position the steering wheel at a pivoted position that is most comfortable and then actuates the set switch which sends a signal to the controller to create a memory associating this particular selected pivoted position with the particular signal received from the ignition key.

In one embodiment, the mechanical drive comprises a curved rack and worm gear driven by the rotary motor to pivot the rack and steering wheel. The rack and worm gear drive means secures the steering column to the wheel column at a plurality of contact points, affording a secure connection between the steering wheel and steering column.

A flexible transmission may connects the rotary motor to the worm gear, allowing these members to be mounted out of line with each other and facilitating in process installation of the disclosed device into presently utilized vehicle configurations. Alternatively, a separate motor package may be mounted adjacent the worm gear.

These and other features and objects of the present invention can be best understood from the following specification and appended drawings of which the following is a brief description.

DETAILED DESCRIPTION OF A PREFERRED EMBODIMENT

Figure 1:
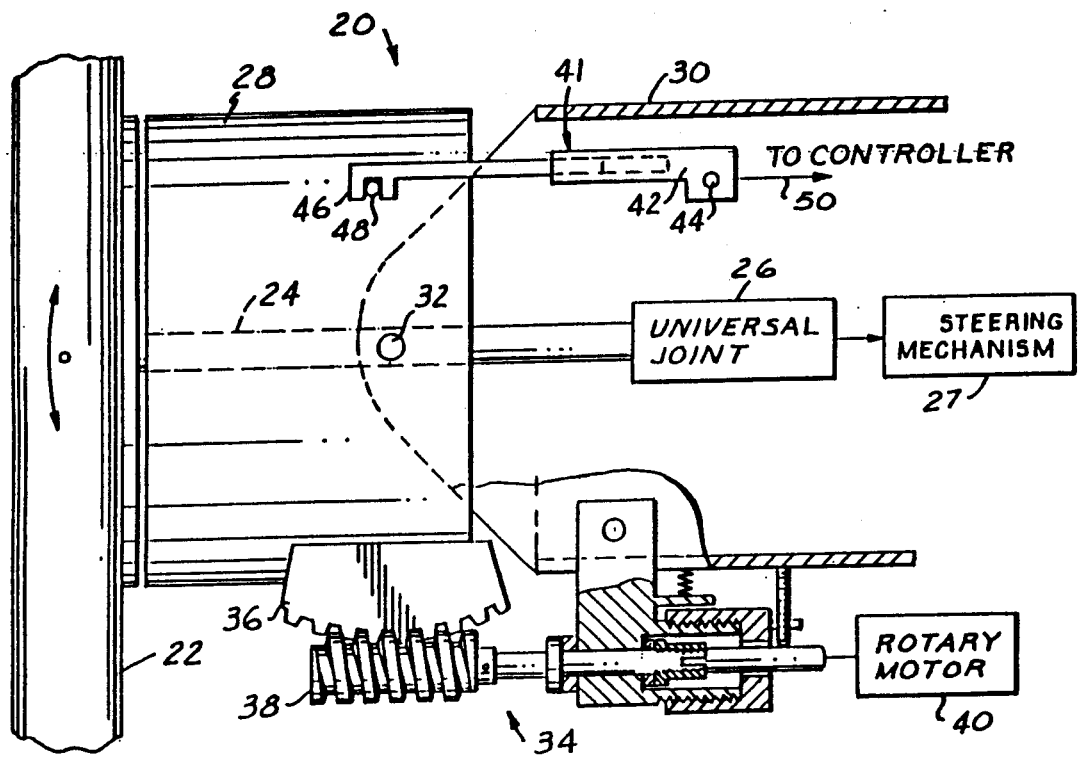
FIG. 1 is a largely schematic view showing a vehicle steering wheel pivoting mechanism.

As shown in FIG. 1, vehicle steering wheel pivoting mechanism 20 includes steering wheel 22 having steering rod 24 connected through universal joint 26 to an operable connection 27 with a steering mechanism. Hollow cylindrical wheel column 28 rotatably receives steering wheel 22 and is pivotally connected 32 at an outer periphery to fixed steering column 30. As is commonly understood, steering wheel 22 rotates within wheel column 28 and drives steering rod 24, U-joint 26 and operable connection 27 to send a signal to the steering mechanism.

Automatic adjustment means 34 has a mechanical drive, which in one embodiment includes a curved rack 36 fixed to wheel column 28 at a vertically lowermost position and meshing with worm gear 38. Reversible rotary motor 40 rotates worm gear 38 to drive curved rack 36 and pivot wheel column 28 with respect to fixed steering column 30. Curved rack 36 has teeth extending on an arc centered at pivot 32.

Transducer assembly 41 consists of first transducer part 42 pivotally pinned at 44 to fixed steering column 30 and second transducer part 46 pivotally pinned at 48 to wheel column 28 and received within first transducer part 42. First transducer part 42 has sensors that send a signal 50 to a controller (not shown in FIG. 1), giving an indication of the extent that second transducer part 46 is received within first transducer part 42 and which is utilized as feedback of the actual pivoted position of wheel column 28 with respect to fixed steering column 30.

As shown in FIG. 1, wheel column 28 is at a vertically intermediate position that may correspond to an individual driver's selected position.

Figure 2:
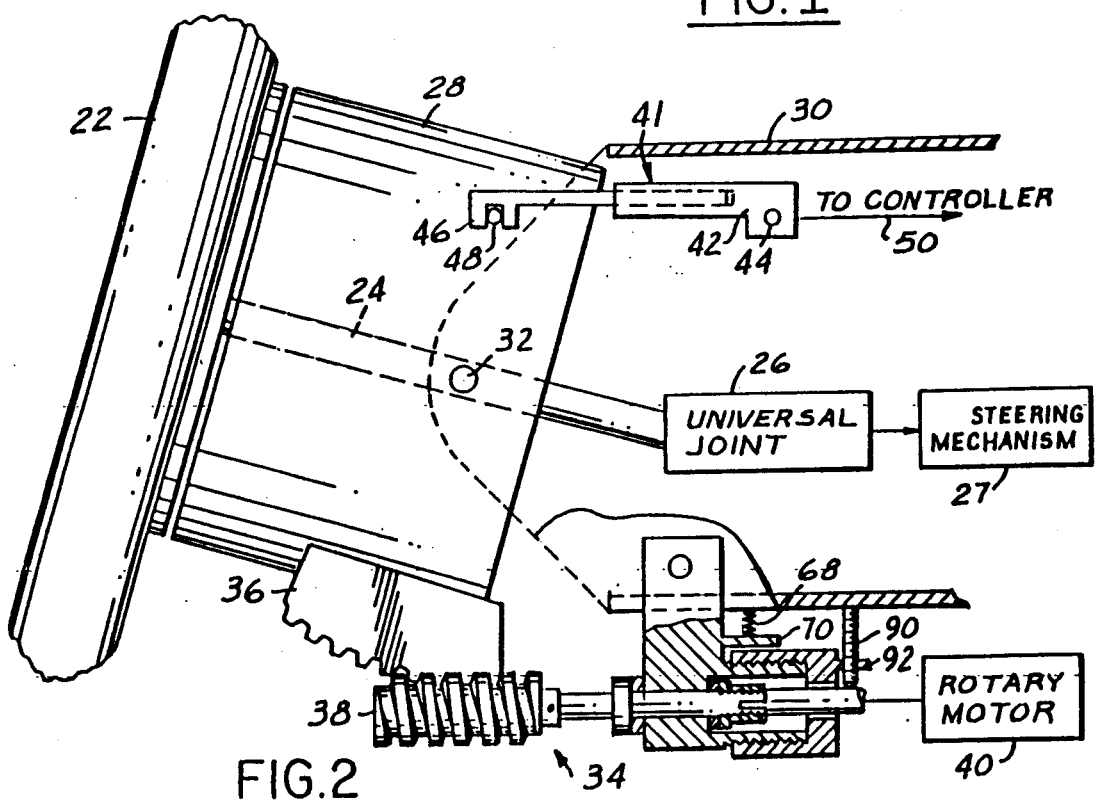
FIG. 2 is a view similar to FIG. 1, but showing the vehicle steering wheel to a vertically uppermost position.

As shown in FIG. 2, worm gear 38 has been driven by rotary motor 40 to move curved rack 36 and pivot wheel column 28 about pin 32 to a vertically uppermost position. Second transducer part 46 is moved to a position where it almost reaches the rear portion of first transducer part 42.

Figure 3:
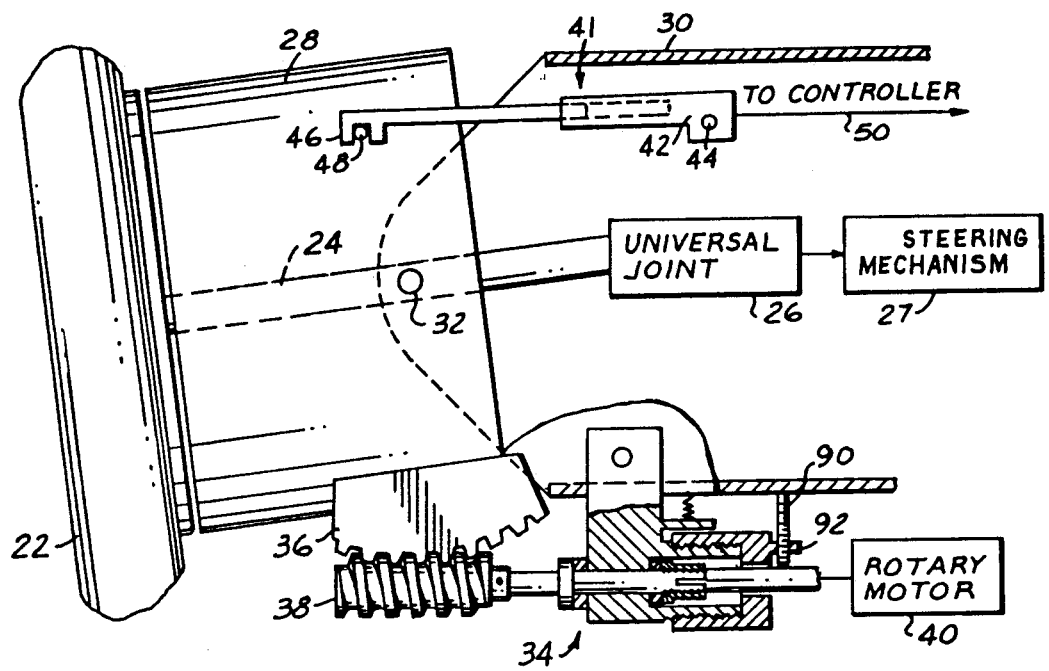
FIG. 3 is a view similar to FIG. 1, but showing the vehicle steering wheel pivoted to a vertically lowermost position.

As shown in FIG. 3, rotary motor 40 has rotated worm gear 38, this time in the opposite direction from that shown in FIG. 2, to move curved rack 36 along worm gear 38 and pivot wheel column 28 to a vertically lowermost position. Second transducer part 46 is moved to a position where it is almost removed from first transducer part 42.

Figure 4:
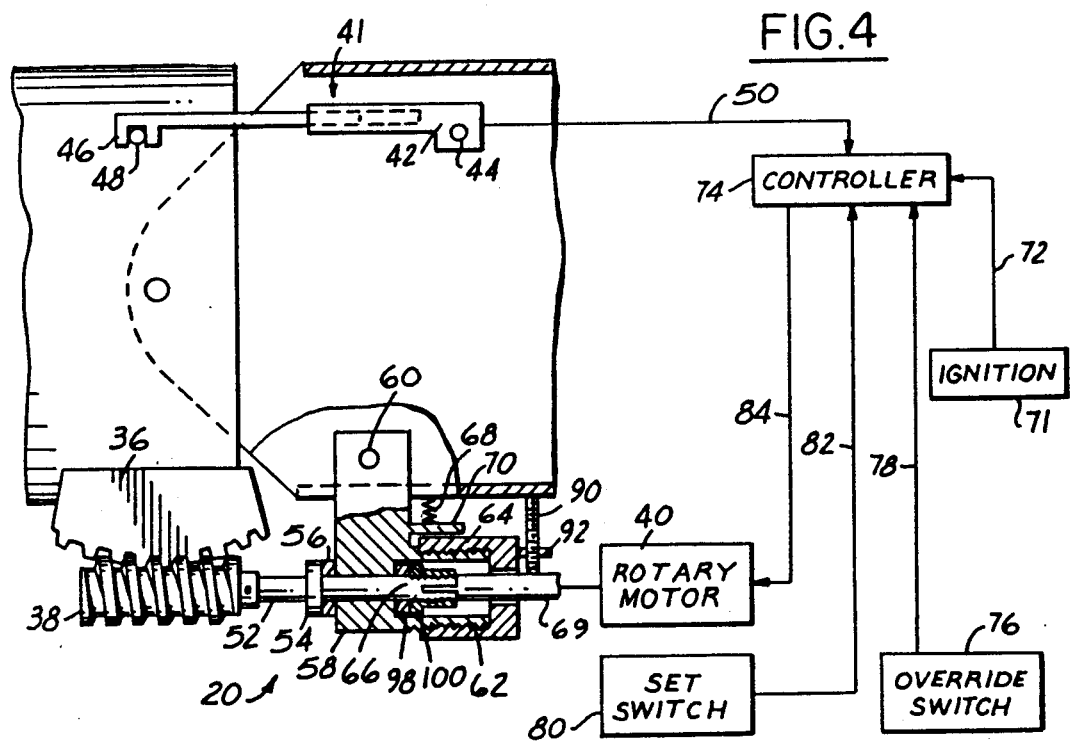
FIG. 4 is an enlarged view similar to FIG. 1, showing the details of the vehicle steering wheel pivoting mechanism.

The control and mechanical details of vehicle steering wheel pivoting mechanism 20 can be best understood from FIG. 4. Worm gear 38 includes shaft 52 which is connected through enlarged flange 54 to thrust washer bearing 56. Shaft 52 extends through pivoted bearing member 58, which is pivoted at 60 to fixed steering column 30, and which includes threaded connection 62 at an axially rear portion thereof receiving a second threaded connection 64. Thrust washer 98 is tightened by lock nut 100 to maintain flexible rotary transmission 66 at a desired position with respect to pivoted bearing 58. Flexible rotary transmission 66 includes cable 69 which is fixed to threaded connection 64 and connects rotary motor 40 to shaft 52. Alternatively, rotary motor 40 may be a complete separate package mounted to pivoted bearing 58 and connected directly to rotary transmission 66 with no flexible connection being required.

The use of a flexible transmission 66 allows rotary motor 40 to be placed out of alignment with worm gear 38 and provides increased flexibility in the mounting of motor 40. This facilitates in process installation of steering wheel pivoting mechanism 20 into presently utilized vehicle configurations.

In addition, a torque convertor may be placed near rotary motor 40 to provide greater torque. A slip clutch may also be placed between rotary motor 40 and worm gear 38 to prevent further pivoting of wheel column 28 if an obstruction is encountered.

Spring member 68 biases reaction flange- 70 and pivoted bearing member 58 downwardly away from fixed steering column 30 to bias worm gear 38 into mesh with curved rack 36. Due to spring 68, worm gear 38 is engaged with curved rack 36 irrespective of the pivoted position of wheel column 28.

In one embodiment, vehicle ignition 71 sends an occupant signal 72 to controller 74 giving an indication of which key has been received within ignition 71. Thus, if two drivers typically operate the vehicle, signal 72 will instruct controller 74 as to which of the two drivers are now operating the vehicle. The required key identification technology is well known in the vehicle ignition art.

A three-way override switch 76 sends signal 78 to controller 74 that the driver wishes to pivot wheel column 28 either vertically upwardly or downwardly. This switch may be of the sort commonly used on vehicle for turn signals, or the release handle used in manually operated tilt steering wheels may be modified to act as a switch.

Override switch 76 in combination with set switch 80 allows a driver to store a pre-selected position within a memory in controller 74 where it is identified as the pre-selected position for the particular ignition key. An individual driver moves wheel column 28 through override switch 76 to a desired position and actuates set switch 80, sending signal 82 to controller 74 which stores the particular position in a memory and identifies it with the key signal 72 that is received from ignition 71. Set switch 80 and override switch 76 could be combined in a single switch.

Now, when the operator again enters the vehicle and puts the key in ignition 71, signal 72 will identify the particular key in ignition 71 to controller 74. In one embodiment, the signal is sent when the key is turned to the accessory position. Controller 74 sends signal 84 to rotary motor 40 which drives worm gear 38 to pivot wheel column 28 through curved rack 36 to the pre-selected position stored in the memory. If the driver wishes to change the pre-selected position, or if a different driver is using the original driver's key, the override switch can again be actuated to move wheel column 28. In this embodiment, as long as set switch 80 is not reactivated, the original stored position will be retained within a memory in controller 74.

When the key in ignition 71 is turned off, signal 72 is sent to controller 74 which sends signal 84 to rotary motor 40 to rotate worm gear 38 and pivot wheel column 28 to the position shown in FIG. 2, where wheel column 38 is pivoted to its vertically uppermost position, allowing easy exit and access to the vehicle.

During any pivotal movement of wheel column 28, transducer 41 continuously monitors the position of second transducer part 46 within first transducer part 42 and sends signal 50 to controller 74 giving a feedback signal of the actual position of wheel column 28 with respect to fixed steering column 30. Controller 74 continues to move worm gear 38 until the signal 50 indicates that the wheel column 28 is in the desired position.

The use of the rack and worm gear drive allows a infinite number of pivoted positions. In addition, worm gear 38 meshes with several of the teeth on curved rack 36, thus providing a mechanical connection at several points and a more secure connection between wheel column 28 and steering column 30. The infinite number of pivoted positions and the multiple point mechanical connection features could be achieved by other types of mechanical drives.

Set screw 90 is received within holder 92, which is integral with bearing member 58 and acts as an adjustable stop to prevent bearing member 58 from pivoting to too great an extent, as may be caused, for instance, by overload, which is illustrated by arrows 0 in FIG. 1. This overload could be caused if an operator pushes on the wheel to too great an extent. If the operator pushes downwardly on the wheel, curved rack 36 will push against worm gear 38 and push stop 90 into wheel column 30, preventing pivoting. If the operator pushes upwardly, steering column 28 pivots upwardly causing the teeth illustrated at the right portion of curved rack 36 to pivot downwardly against worm gear 38; again, stop 90 will be pushed into steering column 30, preventing pivoting. Set screw 90 is shown abutting fixed steering column 30 and preventing any further pivoting upwardly of bearing member 58. Set screw 90 is adjusted to abut fixed steering column 30 and spring 68 ensures worm gear 38 is biased into curved rack 36. During normal operation, and pivoting of wheel column 28, it is not expected that pivoted bearing 58 will pivot about point 60.

In one embodiment, override switch 76 is powered directly from the vehicle battery and thus can cause wheel column 28 to be pivoted even if the key is not in ignition 71.

As an alternate to set switch 80, a timer may sense that wheel column 28 has been in a selected position for a period of time and store the selected position in memory. Another alternative is to simply store the last pivoted position the wheel was in prior to the vehicle being turned off, and return to that position at start-up of the vehicle.

The required hardware for the various controls and switches are all known types, and thus the details of this hardware is not provided here. The rotary motor may be of any known type and may be powered by means other than electricity.

The concept relating to key identification for selecting a particular position for a driver may also be applied to other steering wheel applications, such as telescoping to adjust the distance between the driver and the wheel. Such a device could be driven by a rack and pinion drive.

A preferred embodiment of the present invention has been disclosed, however, certain modifications would be obvious to one of ordinary skill in the art and thus, the following claims should be consulted in order to determine the true scope and content of the present invention.

We claim:

1. A vehicle steering system comprising:
   a fixed steering column;
   a wheel column pivotally connected to said fixed steering column, said wheel column supporting a steering wheel and allowing relative rotation thereof, said steering wheel rotating a steering rod, said steering rod being connected to a connection in said fixed steering column, said connection being operable connected to a steering mechanism; and
   said wheel columns being selectively position in one of a plurality of pivoted positions relative to said fixed steering column, there being means for selecting one of said plurality of pivoted positions relative to said fixed steering column and automatic means operably connected to said wheel column for driving said wheel column thereto;
   said automatic means comprising a mechanical connection between said steering column and said wheel column, said mechanical connection being at a plurality of contact points; and
   said mechanical connection comprising a rack and worm gear connection, said rack being curved and fixed to said wheel column, said worm gear being pivotally mounted to said steering column and rotated by said automatic means.

2. A vehicle steering system as recited in claim 1, and wherein said means for selecting reads a signal and said automatic means moves said wheel column to a selected pivoted position in response to said signal.

3. A vehicle steering system as recited in claim 2, and wherein there are a possible plurality of said signals, and each of said signals identifies one of a possible plurality of selected pivoted position.

4. A vehicle steering system as recited in claim 2, and wherein said signal is read from an ignition key when said ignition key is inserted in the vehicle ignition switch.

5. A vehicle steering system as recited in claim 4, and wherein said wheel column is moved to a vertically uppermost position by said automatic means upon removal of said ignition key from the ignition switch.

6. A vehicle steering system as recited in claim 2, and wherein override switch means are included to move said wheel column to a pivoted position other than said selected pivoted position.

7. A vehicle steering system as recited in claim 6, and wherein switch means are included to store a desired pivoted position in a memory.

8. A vehicle steering system as recited in claim 1, and wherein said means for selecting includes a three-way switch allowing selection of a particular pivoted position.

9. A vehicle steering system as recited in claim 1, and wherein resilient biasing means bias said worm gear into meshing engagement with said rack.

10. A vehicle steering system as recited in claim 9, and wherein said worm gear having a flexible drive connection connected to a reversible rotary drive, said flexible drive being received in a bearing member, said bearing member being pivotally connected to said steering column, said resilient biasing means biasing said bearing member.

11. A vehicle steering system as recited in claim 1, and wherein said wheel column pivots at a point about said fixed steering column, said rack being curved about an arc centered at said point.

12. A vehicle steering system as recited in claim 1, and wherein a feedback signal is supplied to said automatic means, said feedback signal giving an indication of the actual pivoted position of said wheel column with respect to said fixed steering column.

13. A vehicle steering system as recited in claim 1, and wherein there being an infinite number of said pivoted positions.

14. A vehicle steering system as recited in claim 1, and wherein said mechanical connection is on a first longitudinal side of said pivotal connection between said worm gear and said steering column, and a stop mounted on the opposed longitudinal side of said pivotal connection such that said stop prevents said worm gear from pivoting in a direction away from said rack for an overly great amount,.

15. A vehicle steering system comprising:
   a fixed steering column;
   a wheel column pivotally connected to said steering column, said wheel column supporting a steering wheel and allowing relative rotation thereof, said steering wheel rotating a steering rod, said steering rod being connected to a connection in said fixed steering column, said connection being operably connected to a steering mechanism; and
   said wheel column being selectively positioned in any of a plurality of pivoted positions relative to said fixed steering column, there being mechanical connection means between said fixed steering column and said wheel column to maintain said wheel column in any of said plurality of selected pivoted position, said mechanical connections being at a plurality of contact points; and said mechanical connection comprising a rack and worm gear connection, said rack being curved and affixed to said wheel column, said wheel column pivoting about a single pivot point on said fixed steering column; and said worm gear is pivotally mounted to said steering column.

16. A vehicle steering system as recited in claim 15, and wherein there being an infinite number of said pivoted positions.

17. A vehicle steering system as recited in claim 16, and wherein said worm gear having a flexible drive connection connected to a reversible rotary drive, said flexible drive connection being received in a bearing member, said bearing member being pivotally connected to said steering column, and resilient biasing means biasing said bearing member such that said worm gear is biased into meshing engagement with said rack.

18. A vehicle steering system as recited in claim 15, and wherein a switch means allows selective pivotal movement of said wheel column with respect to said fixed steering column.

19. A vehicle steering system as recited in claim 15, and further wherein said mechanical connection is on a first longitudinal side of said pivotal connection between said worm gear and said steering column, and a stop mounted on the opposed longitudinal side of said pivotal connection such that said stop prevents said worm gear from pivoting in a direction away from said rack for an overly great amount.

* * * * *